K. OPL.
PROCESS FOR THE FRACTIONAL SEPARATION OF PARAFFIN AND LIKE SUBSTANCES AND OF MIXTURES OF SUCH SUBSTANCES WITH OIL.
APPLICATION FILED FEB. 7, 1912.
1,128,494.
Patented Feb. 16, 1915.
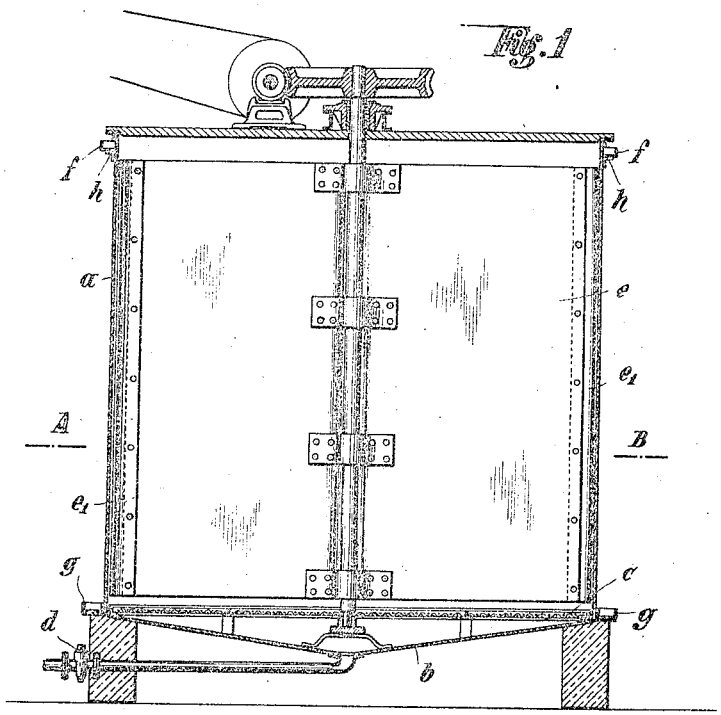
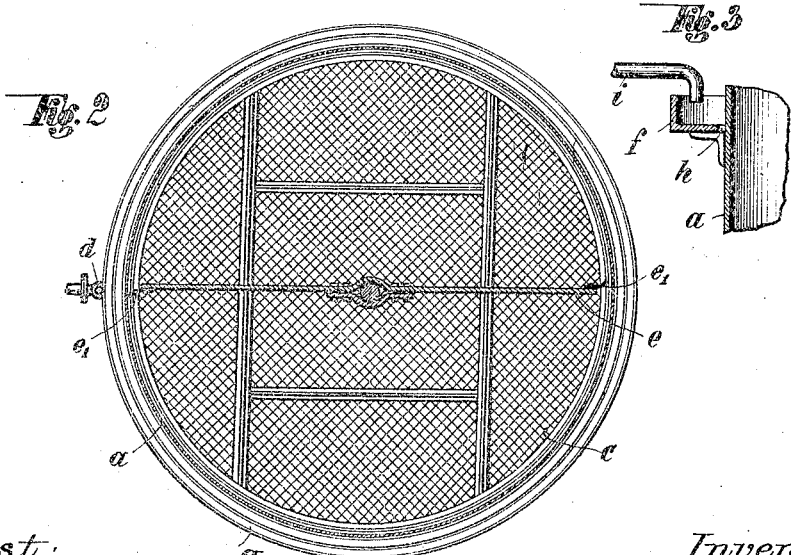

UNITED STATES PATENT OFFICE.

KARL OPL, OF TRIESTE, AUSTRIA-HUNGARY, ASSIGNOR OF ONE-HALF TO TRIESTER MINERAL-OEL-RAFFINERIE, OF TRIESTE, AUSTRIA-HUNGARY.

PROCESS FOR THE FRACTIONAL SEPARATION OF PARAFFIN AND LIKE SUBSTANCES AND OF MIXTURES OF SUCH SUBSTANCES WITH OIL.

1,128,494.  Specification of Letters Patent.  Patented Feb. 16, 1915.

Application filed February 7, 1912. Serial No. 676,137.

*To all whom it may concern:*

Be it known that I, KARL OPL, working director, residing at St. Maria Maddalena Inferiore 1285, Trieste, Austria-Hungary, have invented certain new and useful Improvements in a Process for the Fractional Separation of Paraffin and Like Substances and of Mixtures of Such Substances with Oil, of which the following is a specification.

The modern process for producing paraffins used by nearly all manufacturers, consists in the three following steps: 1. Crystallizing the paraffins by cooling the distillate containing paraffin and separating the crystals obtained from the oil by filtering in filter presses. 2. Improving the paraffins which come out of the filter presses and still contain a large amount of oil, (parffin-butter). 3. Finally extracting the oil from the improved paraffin-butter by the schwitz or sweating process.

The object of the present invention is to provide a process for carrying out all the improved processes in such a manner as to cut down the amount of work necessary to a minimum; and to provide a simple cheap and economic method of doing the same. Instead of allowing a smooth mass to form, as has heretofore been the case, having soft crystals, capable of being poured, and from which the paraffin crystals could be separated only by means of a filter press or other expensive apparatus, the present process accomplishes the separation of the solid from the liquid materials without other means than a crystallizer in which the paraffin will crystallize upon the cooling of the material therein.

Trials have shown that on following determined rules of operation the paraffin crystals melting at a higher temperature can be separated shortly after their production from the paraffin-butter in such manner that they precipitate entirely from the still liquid part in order to solidify on the bottom of the vessel into a solid feltlike mass through which the liquid portions can easily percolate and that only a minimum of oil adheres to the crystals obtained in this manner. For the realization of this action the following are essential: 1. The absolute rest or quietude of the individual particles of paraffin. 2. The rapidity of cooling down. 3. The temperature down to which the product is cooled.

The accompanying drawing illustrates diagrammatically the apparatus which may be used in carrying out the present invention.

Figure 1 shows a longitudinal central vertical section. Fig. 2 shows a horizontal cross section taken on the line A—B of Fig. 1, and Fig. 3 shows a detail in section on a greater scale.

In the drawing $a$ indicates a round retainer having rotatable vertical rectangular blades $e$ therein with any means for rotating them extremely slowly. At their vertical edges, these blades are provided with scrapers $c'$ to prevent the contents from sticking to the sides of the retainer. At the bottom of the retainer is a sieve $c$ of fine wire mesh which acts as a support for the felt like mass of crystallized paraffin and enables the fluid to be drawn off, leaving behind the mass, though the conical shaped bottom $b$ and the valve $d$.

Means for cooling the contents of the container $a$ are provided consisting of a channel $f$ encircling the container and secured thereto near the top edge, having a series of small perforations $h$ in the bottom thereof. The lower end of the container is encircled and has secured thereto a somewhat similar channel $g$ but without perforations. A pipe $i$ (Fig. 3) is provided to supply the channel $f$ with water or other cooling liquid. In operation the cooling water from the pipe $i$ flows into and around in the channel $f$, when by means of the perforations $h$ it trickles therefrom and down the side of the container $a$ until it is caught by the channel $g$ and conducted away.

The operation of my invention is as follows: Paraffin-butter is first heated to 42° C., or 2° C. above its melting point, and then introduced into the retainer. The blades are then caused to rotate very slowly—so slowly that the entire mass is moved as a unit and no relative or mutual change whatever takes place between the particles, as this rotation is for the sole purpose of facilitating the cooling of the mass and not any disarrangement of the paraffin particles. Subsequent to this rotation, the cooling device is set in operation and arranged to cool the mass 0.6 to 0.8° C. per hour until the temperature has been reduced to 29° C. which will take about 18 hours. The rotation of the blades is continued all through the cooling process to aid in the uniform cooling of the mass. During the cooling, the separation of the paraffin takes place by the formation of crystals having greater specific gravity than the butter which sink to the bottom where they form into a felt-like porous mass. This mass falls upon the sieve where it is supported to allow the soft paraffin and oil to permeate through it and be drawn off. After the end of the cooling process the liquid part is left to run out through the porous mass of paraffin which is supported by a wire sieve $c$ arranged above the bottom $b$ and through the sieve by means of the valve $d$ secured at the lowest point.

The condition mentioned under 1 is fulfilled by the slow rotation of the mass in such a way that the mass is revolved as a unit with no disarrangement of the paraffin particles taking place.

The most appropriate speed of rotation of the blades $e$ when paraffin and oil are to be separated is found to be one revolution per minute, but when different paraffins, such as soft and hard, are to be separated, two revolutions per minute is most appropriate.

The conditions mentioned under 2 and 3 are variable according to the melting point and contents of paraffin in the raw material to be treated. At the temperature of 29° C. the percolation of the oil takes place in the above mentioned manner after the rotating device and the artificial cooling device have been stopped. For this percolation or drawing off ¼ to 1 hour is required according to the size of the apparatus. There results then about 40% in weight of the used paraffin-butter as liquid oil, solidifying at 29° C. and containing 40% of paraffin which is let run into any kind of a container and 60% in weight as paraffin mass ceasing to flow at 46–47° C. and containing about 82% of paraffin which is melted by means of a steam-coil in another vessel.

The process characterized in the foregoing is especially important for the refining of paraffin-butter but can also be extended to paraffins free of oil. These represent a mixture of softer or harder paraffin and in the treatment of which, by means of the above described process, the soft paraffins assume the part of the oil. But the cooling down must here take place much slower. When, for instance, paraffin free from oil ceasing to flow at 53° C. is filled at a temperature of 55° in the same apparatus, cooling down takes place advantageously in this manner that the temperature after the first hour sinks to 53° C., and from then on in each hour 0.2 C. down to a temperature of 51° C. The time of cooling amounts then to 11 hours, during which time the precipitation of the harder paraffin takes place. The softer paraffin which is then in a liquid state in the upper part of the apparatus is then percolated, as described further above, in the same manner through precipitated porous mass of hard paraffins and collected in a deeper vessel. It will have a temperature when it ceases to flow of 51°. The hard paraffin mass is melted in another vessel and ceases to flow at 55°. The proportion or quantity of soft and hard paraffin is about 1:1.

I claim:

A process for the fractional separation of paraffin and like substances, consisting in first reducing the material to a molten condition, then simultaneously cooling the substances below the temperature of congelation, and slowly effecting a horizontal displacement of the molten mass as a whole until the paraffin crystals gradually precipitate at the bottom forming a spongy layer, and finally filtering the oil and soft paraffin through said layer, substantially as described.

In testimony whereof I affix my signature in presence of two witnesses.

KARL OPL.

Witnesses:
 ALFRED BARHNAD,
 HUGO ABBOMONOUGH.